United States Patent [19]

Billet et al.

[11] Patent Number: 4,695,787
[45] Date of Patent: Sep. 22, 1987

[54] DEVICE FOR DETECTING AND LOCATING PENETRATION OF WATER INTO A MARINE ACOUSTIC STREAMER

[75] Inventors: Daniel Billet, St. Paul De Vence; Jean F. Cesarini, Nice, both of France

[73] Assignee: Thomson CSF, Paris, France

[21] Appl. No.: 769,735

[22] Filed: Aug. 27, 1985

[30] Foreign Application Priority Data

Aug. 31, 1984 [FR] France .................... 84 13510

[51] Int. Cl.$^4$ .................... G01V 1/38; G01R 31/02
[52] U.S. Cl. .................... 324/557; 324/58.5 B; 367/13; 340/605
[58] Field of Search .................... 367/13, 166; 340/512, 340/513; 73/73; 374/111, 104; 324/365, 58.5 B, 58.5 R, 65 R, 65 P, 61 P, 52

[56] References Cited

U.S. PATENT DOCUMENTS

| 3,470,554 | 9/1969 | Corbell | 340/513 |
| 3,938,385 | 2/1976 | Horwath | 324/58.5 B |
| 4,023,206 | 5/1977 | Nishibe | 324/65 P |
| 4,109,117 | 8/1978 | Wrench | 324/58.5 B |
| 4,455,530 | 6/1984 | Lee . | |

FOREIGN PATENT DOCUMENTS

| 2550940 | 5/1977 | Fed. Rep. of Germany ... 324/58.5 B |
| 2705045 | 8/1978 | Fed. Rep. of Germany ...... 340/513 |
| 2509053 | 7/1983 | France . | |
| 5499558 | 3/1981 | Japan . | |

OTHER PUBLICATIONS

Farber; "Detecting Key Depression"—IBM Bulletin—Apr. 1970, pp. 1876–1877.

Primary Examiner—Reinhard J. Eisenzopf
Assistant Examiner—Jose M. Solis
Attorney, Agent, or Firm—Cushman, Darby & Cushman

[57] ABSTRACT

A device for detecting water penetration into a marine acoustic streamer with segments interconnected by connectors. Each connector positioned between any two adjacent segments is provided with sensors which are constituted by flexible printed circuits having two distinct and interleaved conductive combs thereon. A bifilar line interconnects the sensors, and an emitting and receiving circuit allows a sensor whose impedance has been changed by the infiltration of water into the connector to be located by means of a reflectrometric method, whereby the operating condition of such marine acoustic streamer can be supervised efficiently and at low cost.

6 Claims, 4 Drawing Figures

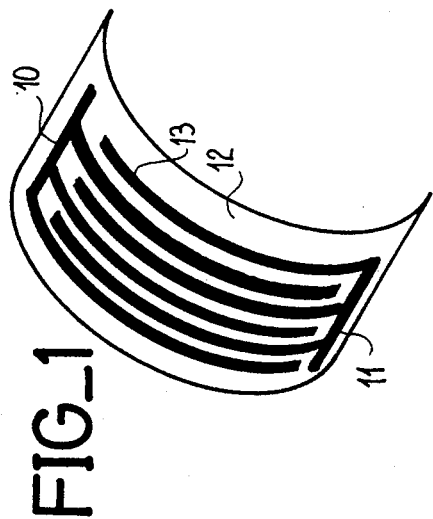
FIG_1
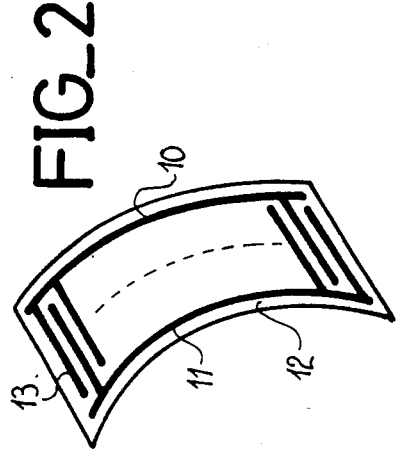
FIG_2
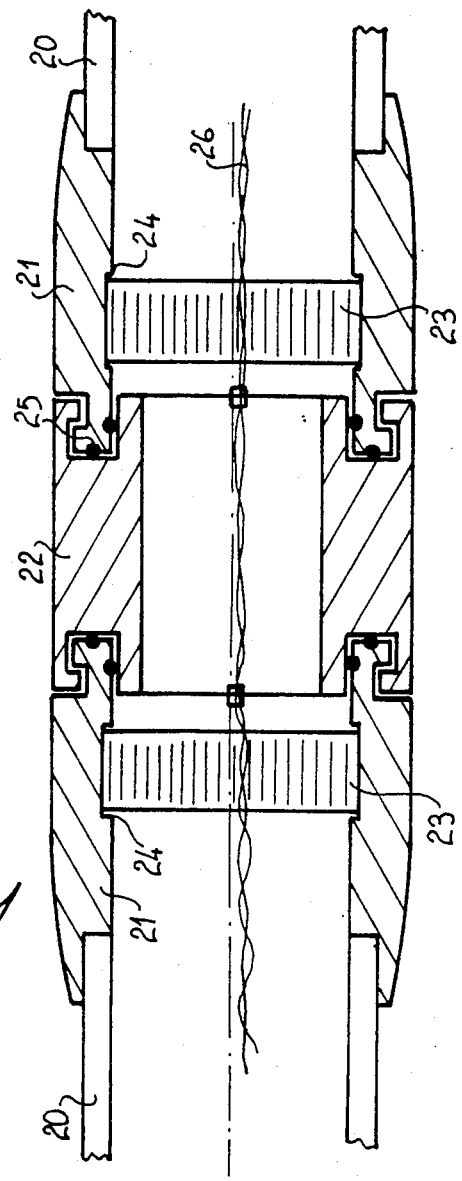
FIG_3

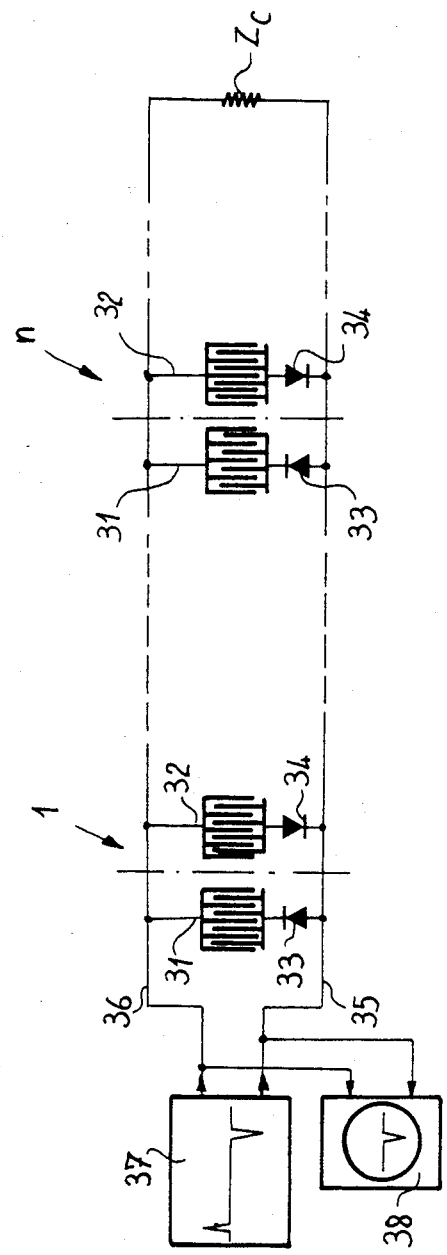
FIG_4

DEVICE FOR DETECTING AND LOCATING PENETRATION OF WATER INTO A MARINE ACOUSTIC STREAMER

FIELD OF THE INVENTION

The present invention is related to devices adapted to detect infiltration of water into the zones of the junctions of a marine acoustic streamer. The invention is related, more particularly, to such a device which, in addition, allows any deficient junction of this kind to be located.

DESCRIPTION OF THE PRIOR ART

Marine acoustic streamers of comparatively great length, e.g. several hundreds of meters, are drawn by a carrier vehicle and are adapted passively to capture submarine noises. Such streamers are able to detect ships and submarines. In some cases they are also used for submarine seismic prospection purposes.

A streamer of this kind is constituted by several segments each segment having a length of several tens of meters and including captors, while being interconnected by means of junctions. These junctions must resist tractive forces amounting to several tons and thus constitute, of course, "weak points" at which water may penetrate due to a lack of tightness. Such water penetration must continuously be detected and located in situ so that it can be taken into account with respect to the gathered information.

U.S. Pat. No. 4,503,526 discloses means for detecting in such a streamer any infiltration of water in the zone of each junction by detecting the parasitic voltage generated between a closed circuit surrounding the supply lines of the electric connection and a conductive return line connected to the negative terminal of a direct current voltage generator, the supply lines being connected to the positive terminal.

In this system the parasitic voltage which appears in the case of water infiltration is a direct current voltage, which results in generating a "contact resistance" between the conductor and the water by electrolysis, which resistance is not clearly defined and may vary from several hundreds of ohms to several tens of kiloohms. Consequently the detection current is not very well known and thus may be insufficient. Furthermore, in this known system the detection is effected by optoelectronic elements which are active elements and thus reliable only to a certain degree, and which in addition must be protected against the action of the high hydrostatic pressure usually prevailing.

The present invention is aimed at providing a device of the type defined herein-above, which allows the above-outlined drawbacks of the known devices to be overcome.

SUMMARY OF THE INVENTION

With this and other related objects in view, the present invention provides a device of the kind considered herein, wherein at least one humidity sensor comprising two distinct imbricate conductor circuits is placed in the zone of each junction so as to occupy all the locations where a water infiltration may possibly occur. These sensors are connected in parallel to a screened bifilar line extending along the marine acoustic streamer. Brief electric pulses applied to said line allow the impedance variations due to humidity to be detected by reflectrometry.

The sensors arranged in this manner are entirely passive, insensitive to the hydrostatic pressure, and entirely cover the inner side of the junction. Furthermore the measuring means are reduced, and while their power consumption is low, they require no critical adjustment or regulation.

These and other objects, features and advantages of the invention will become more clearly apparent from the following detailed description of various embodiments thereof which is given with reference to the appended drawing and by way of illustration, but not of limitation.

BRIEF DESCRIPTION OF THE DRAWINGS

In the drawing:

FIGS. 1 and 2 show two embodiments of sensors constructed in accordance with the present invention;

FIG. 3 is a sectional view of a junction of a marine acoustic streamer provided with such sensors;

FIG. 4 schematically illustrates the measuring means which allow the sensors of a marine acoustic streamer to be supervised.

DETAILED DESCRIPTION OF THE PREFERRED EMBODIMENTS

One convenient way of producing a humidity sensor comprises providing by the methods known per se in the field of printed circuits two comb-shaped circuits as shown in FIGS. 1 and 2. The conductor circuits 10 and 11 comprise a plurality of teeth 13 which are imbricated with respect to each other. Said circuits are supported by an isolating flexible foil 12 having a rectangular shape. Said foil is adapted to be rolled or wound in the direction of its length so as form an annulus in the form of a cylinder which can receive a marine acoustic streamer junction so as to surround the same. In the embodiment shown in FIG. 1 teeth 13 are oriented in the direction of the length (or longitudinal direction) of the foil, i.e. in the direction of the periphery of said annulus or cylinder. In the embodiment shown in FIG. 2 the teeth are oriented in the direction of the width (or transverse direction) of the foil, i.e. in the direction of the generatrices of said annulus or cylinder.

The width of the teeth is not really critical. It only should be sufficiently small so as to allow the provision of a plurality of teeth and thus to multiply the possibilities of short-circuiting the same by the water, and, on the other hand, said teeth should be sufficiently large in width for avoiding accidental rupture thereof. A tooth width in the order of a millimeter is considered a satisfactory average value. However the spacing between adjacent teeth should be comparatively narrow so as to facilitate such short-circuiting by water without generating short-circuits due to various stresses such as those which may result, for example, from the rolling-up or winding of the foil. A width in the order of several tenths of a millimeter, e.g. 0.2 mm, is considered a satisfactory value for these intervals.

As shown in FIG. 3, a marine acoustic streamer junction generally comprises a connecting piece 22 adapted to symmetrically interconnect two connectors 21 affixed respectively to the end of two segments of which only the flexible sheet 25 is represented in the Figure. O-rings 25 are provided for isolating the (non-aqueous and non-conductive) medium present in the inner space of the streamer from the outer medium by constituting a barrier against any flow of water between connecting piece 22 and connectors 21.

Two sensors 23 as described herein-above are wound up to form an annulus and are placed in two annular recesses 24 provided in the inner surface of connectors 21 at locations adjacent to the two ends of connecting piece 22.

These locations represent the points through which the water must pass if it breaches the barrier constituted by O-rings 25 and penetrates the inner space of the streamer.

A bifilar line 26, preferably twisted and shrouded extends along the streamer in the inner space thereof. The combs of sensors 23 are connected respectively to the wires of said line, for example by welding onto pellets provided during the engraving of the combs.

FIG. 4 shows the electric wiring diagram of the device. Line 26 comprises two wires 35 and 36 across which sensors 31 (left) and 32 (right) are connected for each junctions; only a first junction 1 and an $n^{th}$ junction n are shown in the Figure. A pulse generator 37 is adapted to transmit to one end (tractive side) of the line very brief periodical electric pulses the duration of which is shorter than the to-and-fro propagation time between two junctions, and the period of which is longer than the to-and-fro propagation time over the entire length of the marine acoustic streamer and its connections to the measuring apparatus.

This line is closed at its other end by an impedance component $Z_c$ the impedance of which is equal to the characteristic impedance of said line, taking into account the load represented by the sensors.

In accordance with the well-known reflectrometric method the pulses are reflected on the impedance discontinuities located along the line, and return to generator 37.

An oscillograph 38 (for example) connected in parallel with generator 37 allows the instants of starting and return of said pulses to be detected. Thus the locations of the reflecting discontinuities on the line are easily determined.

The most important ones of these discontinuities are due to impedance modifications resulting from the presence of water infiltrated onto sensors 31, 32, which brings about a variation of resistance and capacity.

This method is not sufficiently accurate to enable the device to distinguish between the two sensors of one and the same junction; however such distinction must subsequently be made to avoid replacing the non-faulty sensor at the junction.

In order to effect such discrimination a dissymmetry is introduced with respect to the right hand sensors and the left hand sensors of the junctions by connecting them to one of the wires, or conductors, of the line through two diodes 33 and 34, respectively, which are connected top-to-bottom-wise. Thus when transmitting pulses having reverse polarities it is possible to deduct from an echo corresponding to a given junction whether such echo stems from the left hand sensor or the right hand sensor of the junction.

Since the possible locations of the echoes are known in advance and since the length of the streamer segments is generally great the temporal measurement accurateness may be reduced. With a view to resolving the problems arising from reading strong echoes, on the one hand, and weak echoes, on the other hand, the attenuation due to the distance crossed by the signal can be compensated advantageously when the return signal is detected with a threshold that decreases exponentionally with time. This decrease is fixed with a view to maintaining a substantially constant level of the echoes and the precision in the case of high-level echoes. Such threshold can be obtained in a very simple manner by causing a capacitor to discharge into a resistor.

Satisfactory results have been obtained with a marine acoustic streamer of a conventional type when pulses of a duration of 80 ns and an amplitude of 15 V at emission were used.

The invention is not limited to the embodiments shown and described herein; many variants and modifications may be envisaged by those skilled in the relevant art without departing from the spirit and scope of the invention as defined in the appended claims.

We claim:

1. A marine acoustic streamer assembly for passively detecting submarine noises comprising:
    a plurality of hollow streamer elements connected to each other by sealed junctions and filled with a non-conducting oil;
    a plurality of humidity sensors disposed in said streamer elements proximate said junctions;
    means for monitoring said humidity sensors to determine if any of said sealed junctions has water leaking therein and for determining the location of such leakage if it exists by means of brief pulse reflectometry.

2. A device for detecting and locating penetration of water into a marine acoustic streamer which is formed by elements connected to each other by junctions and filed with non-conductive oil, said junctions comprising connectors provided with annular recesses at their inner surfaces, which comprises:
    humidity sensors placed into said recesses, said humidity sensors comprising a flexible isolating foil wound-up so as to form annuluses and two distinct electric circuits having the shape of interleaved combs and disposed on said foil so that the impedance between said circuits varies in the presence of water; and
    measuring means for remotely monitoring these variations of impedance, said measuring means comprising a bifilar line extending along said marine acoustic streamer and to which said sensors are connected, an impedance equal to the charactersitic impedance of said line for looping said line at one of its ends, and means connected at the other end of said line of measuring said variations of impedance by brief pulse reflectometry.

3. A device according to claim 2, wherein the teeth of each interleaved comb are oriented in the direction of the circumference of the connector.

4. A device according to claim 2, wherein the teeth of each interleaved comb are oriented in the direction of the generatrices of the connector.

5. A devide according to claim 2, which further comprises diodes arranged with mutually inversed polarity for connecting said sensors of any given junction to said line, while said impedance variations measuring means allow pulses of alternating polarity to be transmitted through said line so as to separate the echoes produced by the sensors at a given junction.

6. A device according to claim 2, wherein said measuring means allow echoes to be detected in accordance with a threshold exponentionally decreasing with their return time so as to compensate for the attenuation due to their travel along said line.

* * * * *